United States Patent
Gao et al.

(10) Patent No.: US 9,792,056 B1
(45) Date of Patent: Oct. 17, 2017

(54) MANAGING SYSTEM DRIVE INTEGRITY IN DATA STORAGE SYSTEMS

(71) Applicant: EMC Corporation, Hopkinton, MA (US)

(72) Inventors: Jian Gao, Beijing (CN); Peter Puhov, Shrewsbury, MA (US); Zhipeng Hu, Beijing (CN); Wei He, Chengdu (CN); Shay Harel, Marlborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 14/230,425

(22) Filed: Mar. 31, 2014

(51) Int. Cl.
*G06F 3/06* (2006.01)

(52) U.S. Cl.
CPC .......... *G06F 3/0619* (2013.01); *G06F 3/0655* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 6,496,914 | B1 * | 12/2002 | Vook | G06F 3/0604 709/220 |
| 6,725,331 | B1 * | 4/2004 | Kedem | G06F 11/2094 711/112 |
| 2004/0066699 | A1 * | 4/2004 | Nabekura | G06F 3/0607 365/232 |
| 2004/0221102 | A1 * | 11/2004 | Watanabe | G06F 3/0611 711/112 |
| 2005/0080992 | A1 * | 4/2005 | Massey | G06F 3/0605 711/114 |
| 2008/0244196 | A1 * | 10/2008 | Shitomi | G06F 3/0605 711/147 |
| 2008/0294858 | A1 * | 11/2008 | Sakai | G06F 3/0605 711/161 |
| 2012/0047511 | A1 * | 2/2012 | Grusy | G06F 3/061 718/104 |
| 2012/0072642 | A1 * | 3/2012 | Okamoto | G06F 3/0607 711/103 |
| 2012/0278584 | A1 * | 11/2012 | Nagami | G06F 3/0607 711/170 |
| 2013/0346756 | A1 * | 12/2013 | Cook | G06F 21/00 713/189 |
| 2014/0258608 | A1 * | 9/2014 | Viswanatha | G06F 12/0873 711/113 |

* cited by examiner

*Primary Examiner* — Edward Dudek, Jr.
(74) *Attorney, Agent, or Firm* — Krishnendu Gupta; Jason A. Reyes (57) ABSTRACT

A technique for managing system drive integrity in data storage systems is disclosed. A plurality of storage drive data structures configured to store data associated with a system drive is created, wherein each storage drive data structure includes a data structure initialization string, a unique storage system identifier, a plurality of unique system drive identifiers associated with respective system drives, and a board replacement flag. Respective data structures are stored on each of the plurality of corresponding system drives. The contents of one or more of the data structures stored on one or more of the plurality of systems drives are read via an instruction initiated by a data store system. A drive type for one or more system drives is determined based on the contents.

20 Claims, 8 Drawing Sheets

| Drive type | FRU_DP initialized? | FRU_SIG initialized? | WWN Seed in DP match to system? | WWN Seed in Sig match to system? | Is sys disk in correct location via FRU_DP SYS_Disk_SN[0/1/2/3] system? |
|---|---|---|---|---|---|
| New drive | No | No | NA | NA | NA |
| Different array system drive | Yes | Yes | No | No | NA |
| Different array user drive | No | Yes | NA | No | NA |
| Current array user drive | No | Yes | NA | Yes | NA |
| Current array system drive in a wrong slot | Yes | Yes | Yes | Yes | No |
| Current array system drive in the correct slot | Yes | Yes | Yes | Yes | Yes |

FIG. 7

| | Use Cases | Storage System Behavior |
|---|---|---|
| 1 | Insert a new drive in a System slot | Rebuild the drive, let array continue booting |
| 2 | Insert single foreign array user drive to a System slot | Rebuild the drive, let array continue booting |
| 3 | Insert single current array user drive to a System slot | Block drive from going online, inform user, let array continue booting |
| 4 | Insert different array System drive in a System slot | Rebuild the drive, let array continue booting |
| 5 | Insert current array System drive in a different System slot | System drives disordered, inform user what is wrong and how to recover. Let array enter service mode |
| 6 | Normal case | Mark all system drives valid, and boot array normally |
| 7 | Missing one system drive | Let array continue booting |
| 8 | Single foreign system drive inserted in array | Rebuild that drive from another system drive. Let array continue booting |
| 9 | All System drives get swapped with foreign System drives | System drives will not be updated and system comes up in an uninitialized state. |
| 10 | Array chassis gets replaced | BRD_REP_FLAG value true. All system drives are valid, but do not match with system value. Update FRU_DESCRIPTOR with new chassis WWN Seed |

FIG. 8

MANAGING SYSTEM DRIVE INTEGRITY IN DATA STORAGE SYSTEMS

BACKGROUND

Technical Field

This application relates generally to managing system drive integrity in data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation of Hopkinton, Mass. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a data storage system including a plurality of host interface units, disk drives, and disk interface units. The host systems access the data storage system through a plurality of channels provided therewith. Host systems provide data and access control information through the channels and the storage system provides data to the host systems also through the channels. The host systems do not address the disk drives of the storage system directly, but rather, access what appears to the host systems as a plurality of logical disk units. The logical disk units may or may not correspond to the actual disk drives. Allowing multiple host systems to access the single data storage system allows the host systems to share data stored in the storage system. In order to facilitate sharing of the data on the data storage system, additional software on the data storage systems may also be used.

When a storage device of a RAID group fails, the storage system selects a reserved storage device (e.g., disk drives and/or SSD's, which are kept on standby) and creates a spare storage device from the selected device to replace the failed device. The system then repairs the RAID group, by binding the selected spare storage device to the group, regenerating data for the failed storage device from the RAID group's remaining operating storage devices, and storing the regenerated data on the spare. With the failed storage device replaced and the data from the failed storage device regenerated using parity information, the fault tolerance of the RAID group is restored to its original level.

In conventional data storage systems, each storage device is maintained in a fixed bus/enclosure/slot in the storage system once it is discovered and bound to a RAID group. With this approach, any movement of the storage device due to human error or enclosure swap degrades the RAID group even if the storage device shows up in a formerly empty slot. Furthermore, if a failed storage device is replaced with a 'hot spare' device, the storage system goes into an equalizing process in which all the data is copied from the hot spare device back to the new storage device. The problem with the equalizing process is that it causes unnecessary stress on both devices and often causes data unavailability.

SUMMARY OF THE INVENTION

A technique for managing system drive integrity in data storage systems is disclosed. A plurality of storage drive data structures configured to store data associated with a system drive is created, wherein each storage drive data structure includes a data structure initialization string, a unique storage system identifier, a plurality of unique system drive identifiers associated with respective system drives, and a board replacement flag. Respective data structures are stored on each of the plurality of corresponding system drives. The contents of one or more of the data structures stored on one or more of the plurality of systems drives are read via an instruction initiated by a data store system. A drive type for one or more system drives is determined based on the contents.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
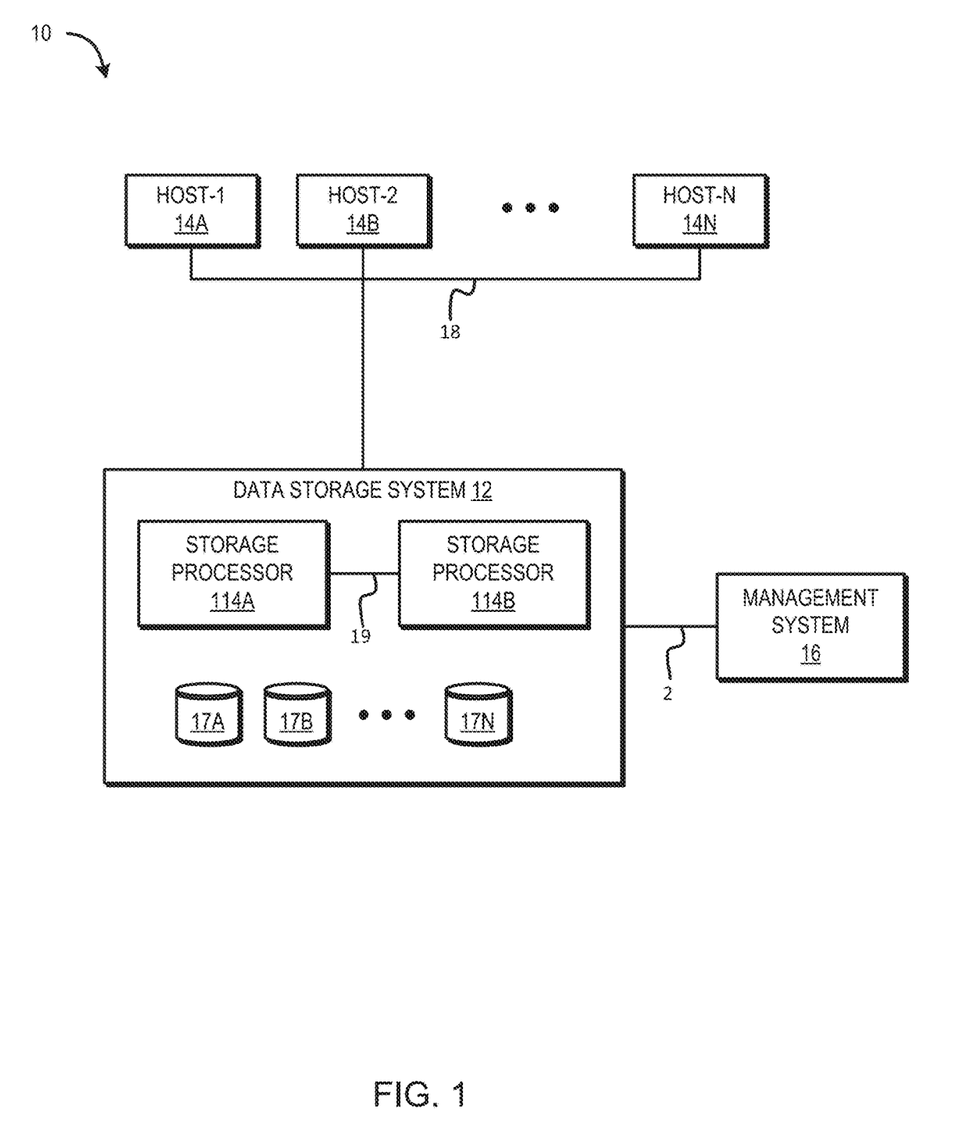
FIG. 1 is an example embodiment of a system that may utilize the techniques described herein.

FIG. 1 depicts an example embodiment of a system that may be used in connection with performing the techniques described herein. The system 10 includes one or more data storage systems 12 (also referred to as storage array(s)) connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of storage devices 17a-17n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17a-17n and two storage processors 114A, 114B. The storage processors 114A, 114B may include a central processing unit (CPU) and memory and ports (not shown) for communicating with one or more physical or virtual hosts 14A-14N. The storage processor may be communicatively coupled via a communication medium such as storage processor bus 19. The storage processor units may be included in the data storage system 12 for processing requests and commands. In connection with performing techniques herein, an embodiment of the data storage system may include multiple storage processors including more than two storage processors as described. The VNX® data storage system mentioned above may include two storage processors 114A, 114B for performing processing in connection with servicing requests. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
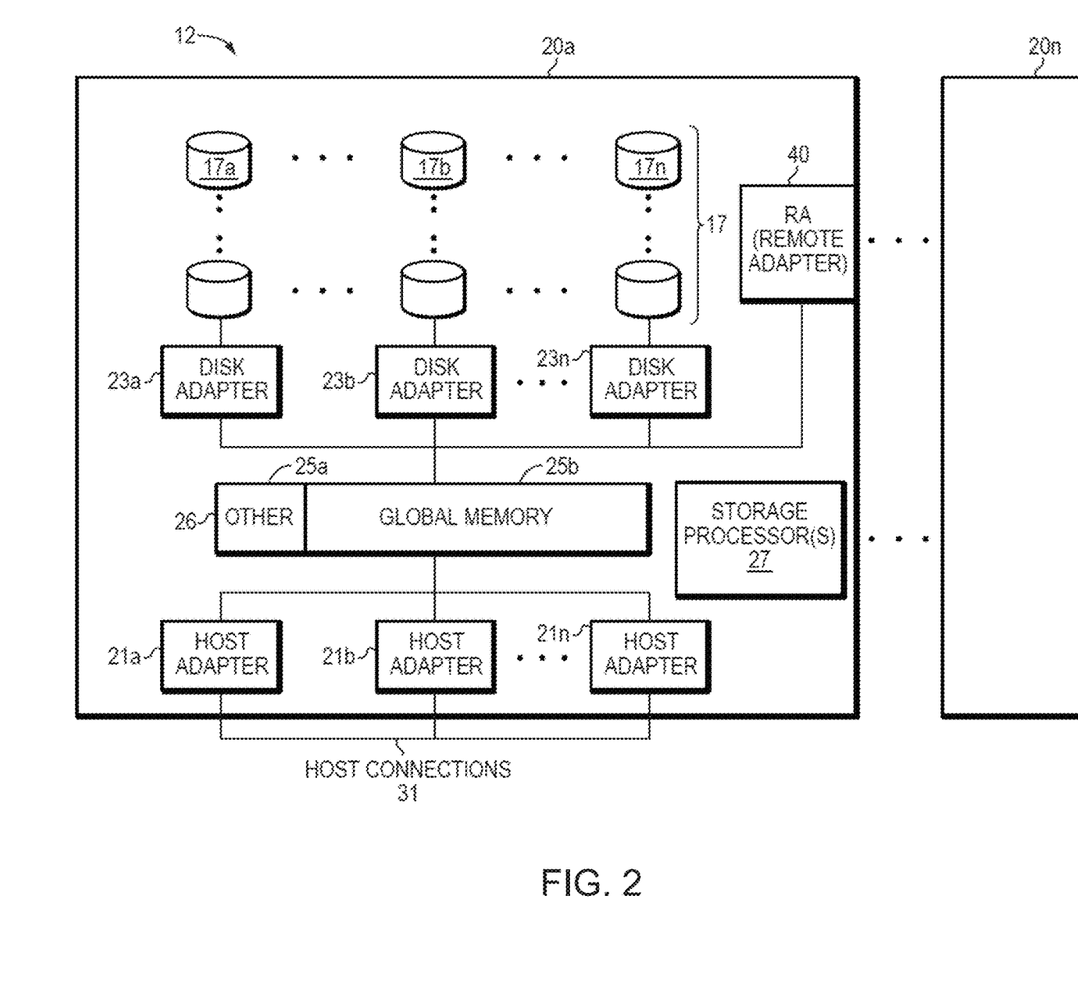
FIG. 2 is a diagram illustrating in more detail components of FIG. 1 that utilize the techniques described herein.

FIG. 2 illustrates an example of components of data storage system 12 that may be included in the system 10 of FIG. 1. The data storage system 12 of FIG. 2 includes one or more data storage systems 20a-20n as may be manufactured by one or more different vendors as noted above. Each of the data storage systems 20a-20n may be a data storage array inter-connected (not shown) to other data storage array(s). Additionally, as noted above, the data storage systems may also be connected to the host systems through any one or more communication connections 31. In this example, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 17 consisting of n rows or shelves of disks or more generally, data storage devices, 17a-17n. In this arrangement, each row of disks may be connected to a disk adapter ("DA") or director responsible for the backend management of operations to and from a portion of the disks 17. In the system 20a, a single DA, such as 23a, may be responsible for the management of a row of disks. In a data storage system such as by EMC Corporation of Hopkinton, Mass., a backend DA may also be referred to as a disk controller. The DA may perform operations such as reading data from, and writing data to, the physical devices which are serviced by the DA.

The system 20a may also include one or more storage processors 27. Each of the storage processors 27 may be CPU and an embodiment may include any number of such processors. For example, the data storage system may include two storage processors. The system 20a may also include one or more host adapters ("HAs") or directors 21a-21n. Each of the HAs may be used to manage communications and data operations between one or more host systems and global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems, various types of directors or adapters may be implemented as a processor, or, more generally, a component that includes the processor. Examples of directors are disk adapters (DAs), host adapters (HAs), remote adapters (RAs) and the like. A remote adapter 40 (RAs) may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 3:
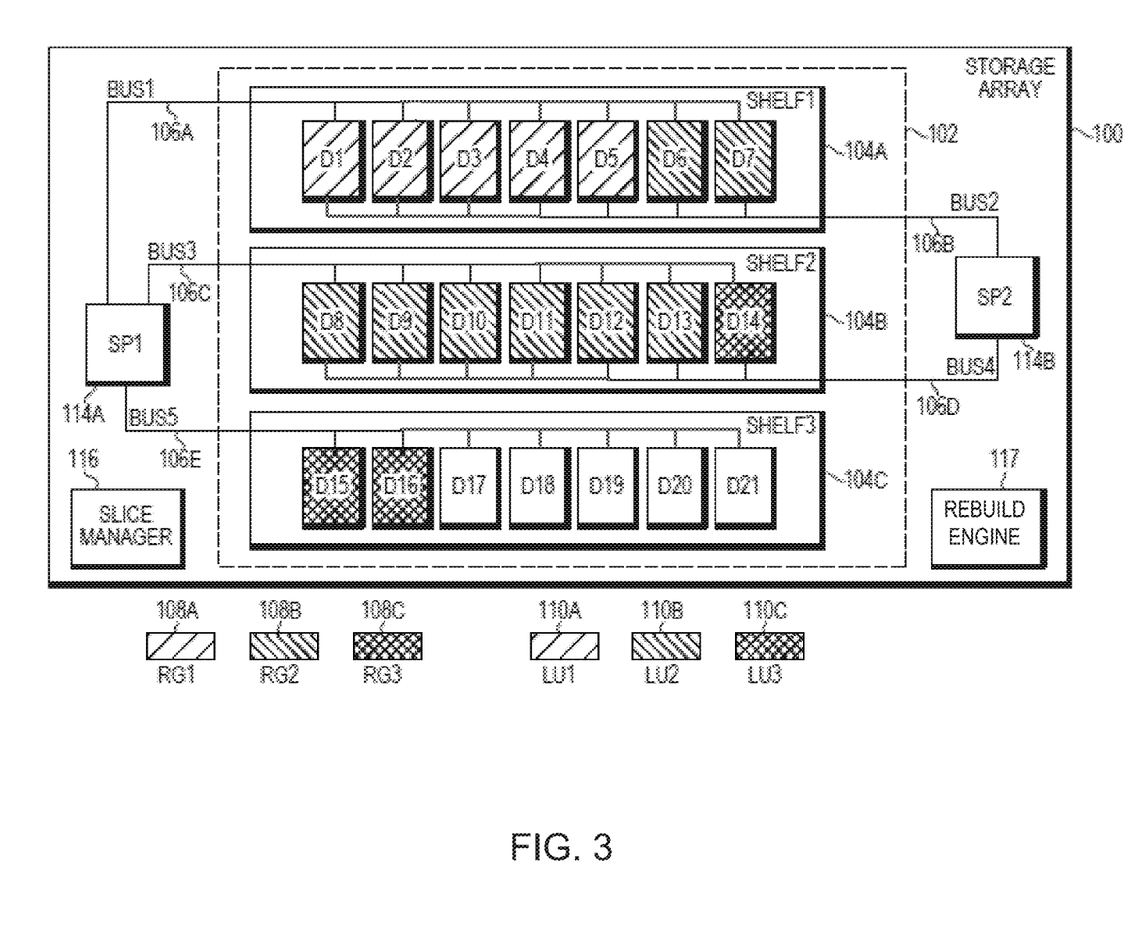
FIG. 3 is a diagram illustrating in more detail components of FIG. 1 that may be used with the techniques described herein.

FIG. 3 illustrates a storage array 100 that may include multiple storage devices 102, which are hard disk drives such as serial attached SCSI (SAS) drives, FibreChannel (FC) Drives, serial advanced technology attachment (SATA) drives flash drives, or some combination of the above. In one embodiment, storage devices 102 may be organized into multiple shelves 104, each shelf containing multiple storage devices. In the embodiment illustrated in FIG. 3, storage array 100 includes three shelves, Shelf1 104A, Shelf2 104B, and Shelf3 104C, each containing seven storage devices, D1-D21. In one embodiment, each storage device 102 may be dual ported devices and connected to each storage process via independent buses 106. In the embodiment illustrated in FIG. 3, each shelf 104 has two buses 106, each of which connects to every device 102 on shelf 104. For example, Shelf1 104A has two buses, Bus1 106A and Bus2 106B, where Bus1 106A is connected to devices D1-D7 and Bus2 106B is also connected to devices D1-D7. Similarly, Shelf2 104B has two buses, Bus3 106C and Bus4 106D, where Bus3 106C is connected to devices D8-D14 and Bus4 106D is connected to devices D8-D14. Lastly, Shelf3 104C has one bus, Bus5 106E, where Bus5 106E is connected to devices D15-D21. It may be appreciated that the configuration of storage array 100 as illustrated in FIG. 3 is for illustrative purposes only and is not to be considered a limitation of the subject matter described herein.

In addition to the physical configuration, storage devices 102 may also be logically configured. For example, multiple storage devices 102 may be organized into redundant array of inexpensive disks (RAID) groups, or RGs 108, shown in FIG. 3 being differently shaded as RG1 108A, RG2 108B, and RG3 108C. Storage devices D1-D5 are shown organized into a first RAID group, RG1 108A, while storage devices D6-D13 are organized into a second RAID group, RG2 108B, and storage devices D14-D16 are organized into a third RAID group, RG3 108C. In one embodiment, a RAID group may span multiple shelves and/or multiple buses. Although RAID groups are composed of multiple storage devices, a RAID group may be conceptually treated as if it were a single storage device.

Storage devices 102 may be managed by one or more storage processors 114. Storage processors (SPs) 114 may be responsible for allocating storage and maintaining information about how that allocated storage is being used; maintaining the map may be done by the storage processors. Storage processors 114 may maintain information about the structure of the file system whose contents are being stored in the allocated slices. For example, SP1 114A may be connected to bus1 106A, bus3 106C, and bus5 106E for managing disks D1-D3, D8-D11, and D15-D16. Similarly, SP2 114B may be connected to bus2 106B, and bus4 106D for managing disks D41-D7, and D12-D14. It may be appreciated that multiple SPs can manage all disks/buses at the same time but may coordinate with each other.

In addition to RAID groups, each logical unit 110 may be further subdivided into slices (not shown). In the embodiment illustrated in FIG. 3, RG1 108A/LU1 110A may be divided into multiple slices that may be allocated, de-allocated, re-allocated, reserved, or relocated by slice manger 116. A slice may be, for example, a 1 GB slice of data. However, the techniques described herein should not be construed as being limited to only slices of data; the techniques are equally applicable to other data chunk sizes, such as blocks, slivers (subset of slices), page, file and the like.

Slice manager 116 may be a software application or layer that is executed, at least in part, by one or more SPs 114. Slice manager 116 may be responsible for implementing a slice allocation policy. For example, slice manager 116 may receive slice allocation requests, service slice allocation requests, and maintain relevant statistical information regarding slices. It may be appreciated that spreading data across multiple disk drives in an array allows for data to be read from the drives in parallel, increasing I\O performance.

In the event a drive associated with a RAID group becomes unavailable, data for the drive may need to be rebuilt. For example, employing techniques described herein, a drive may be temporarily removed and reinserted a short time later either in the same slot or a different slot in the same or different shelf 104. Data that was written to the drive while it was removed from the storage array may be rebuilt via a rebuild engine 117. As will be described in more detail below, the rebuild engine 117 may create and/or maintain a rebuild bitmap that may track sectors that would have been written to on the removed drive. If the drive is reinserted within a predetermined time period, the rebuild engine 17 may initiate a rebuild such that only the differential data is rebuilt, thereby dramatically reducing the rebuild time.

Figure 4:
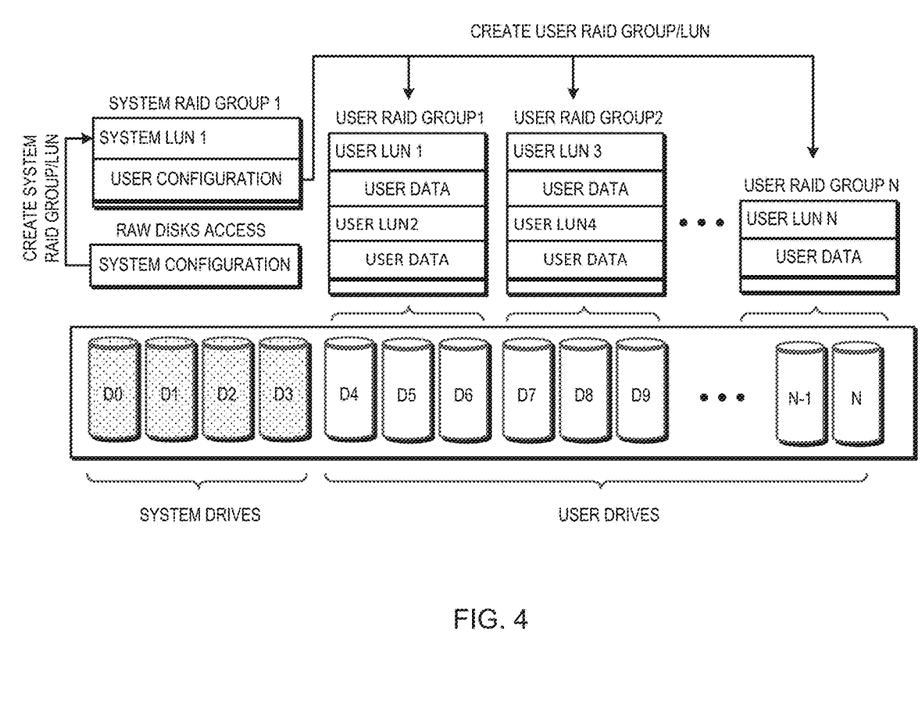
FIG. 4 is a diagram illustrating a RAID configuration that may utilize the techniques described herein.

Referring to FIG. 4, shown is an example illustrating a data storage system in an example embodiment in accordance with techniques herein. Drives D0-DN in a data storage system may be characterized as a system drive or a user drive. A system drive may store data used internally and privately within the data storage system and a system drive may not be used to store user data, such as may be written by a host or other client of the data storage system. The system drives may, for example, include boot code for booting the data storage system.

User drives may be used to store user data, such as used by a host or other client of the data storage system. I/O requests, such as from a host, may be received at the data storage system whereby such I/O requests (e.g., read and/or write requests) may be directed to user drives. In a data storage system, system drives may be located in predetermined or expected physical locations within the data storage system disk enclosure. Additionally, a data storage system may include a predetermined number of system drives. For example, in one data storage system, there may be 4 system drives located in the first disk enclosures on the first bus. Remaining drives may be user drives. Element 204 denotes that user drives may be consumed or provisioned for storing user data.

As used herein, a consumed user drive may refer to a user drive positioned in a user drive slot that has been provisioned for storing user data such as a result of configuring the user drive as a member of a RAID group used for storing user data. A user drive may be referred to as a consumed user drive, if the drive in the user slot is configured as a RAID group member just described. A user drive may alternatively be referred to as an unconsumed user drive if the drive is in the user drive slot but the drive is however not yet configured as a RAID group member.

In an example configuration illustrated in FIG. 4, drives D0-D3 are system drives, D4-D6 are user drives arranged as user RAID group 1 which includes user LUN 1, user LUN 2, and user data, D7-D9 are user drives arranged as user RAID group 2 which includes user LUN 3, user LUN 4, and user data, and drives N-1-N are user drives arranged as user RAID group N which includes user LUN N and its user data. Such arrangements are for discussion purposed only and should not be construed as a limitation as other alternative arrangements comprising suitable RAID configurations may be similarly implemented.

In conventional storage system, drives are tied to a particular slot in a particular shelf in the system. Consequently, in such systems, user drives cannot be pulled out of one slot and installed in another user slot. By contrast, the techniques described implement a concept referred to as portable drives where a user drive can be pulled out of one slot and installed in any other user slot in its system. For a more detailed discussion of portable drives and processing therewith, see for example, U.S. patent application Ser. No. 14/141,310, filed Dec. 26, 2013, entitled "MANAGING RAID GROUPS COMPRISING PORTABLE STORAGE DEVICES" and/or U.S. patent application Ser. No. 14/138,415, filed Dec. 23, 2013, entitled "DEFERRED DRIVE PROCESSING" the entire teachings of which are incorporated herein by reference.

The integrity of data stored on the storage array may be protected by creating and using RAID groups to provide data recovery and drive failure protection mechanisms. System configuration information may be stored on the system drives and initially accessed in raw disks. The system configuration information is then used to create one or more RAID groups and LUNs such as system RAID group 1, system LUN 1. User configuration information may be stored in the system RAID group 1 to ensure integrity of the information. The user configuration information may then be used to create user RAID groups and LUNs, such as user RAID groups 1, 2, N and LUNs 1, 2, 3, 4, N, respectively, as shown.

Figure 5:
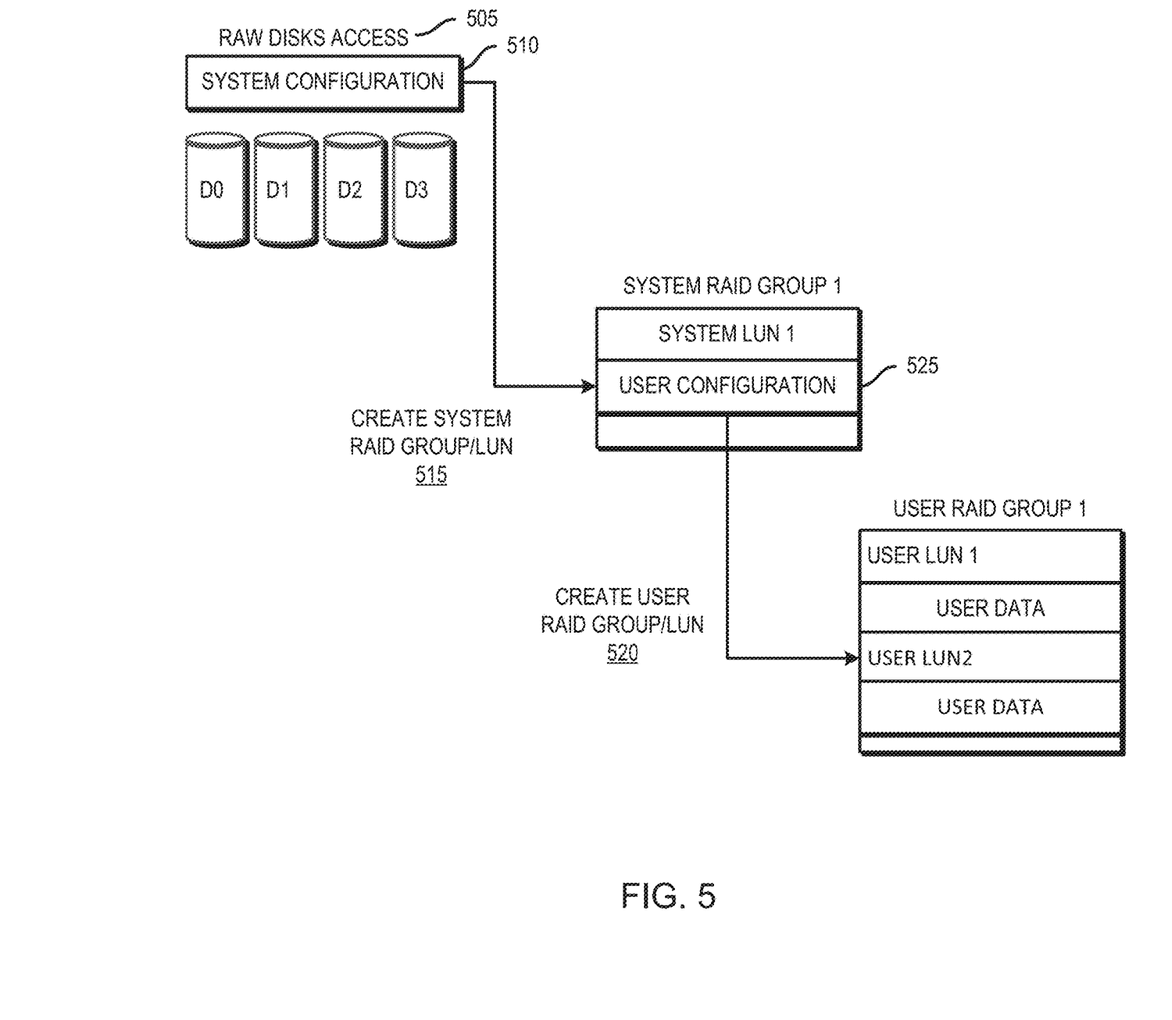
FIG. 5 is a diagram illustrating a RAID group/LUN creation process and integrity mechanism.

FIG. 5 illustrates the RAID group/LUN creation process and integrity mechanisms in additional detail. The storage system reserves private space on the system drives D0-D3 for storing user mode configuration information 525. However, before the configuration information can be read, it must be validated to ensure it is consistent with what was written therein. This check should be done before any normal RAID logic can be executed.

In operation, system configuration 510 stores configuration information and other functionality used to create RAID groups. On initial creation, the system configuration 510 is obtained via raw disk access 505. That is, the system configuration information 510 resides on raw system drives D0-D3 (i.e., not arranged in a RAID configuration). Once obtained, the information can be used to create subsequent RAID groups. For example, a RAID group/LUN creation 515 may be initiated whereby system RAID group 1 and system LUN 1 are created based on the system configuration information 510. User configuration information 525 is also created and is stored in the system RAID group 1. Thus, the integrity of the user drives used to store the system LUN 1 and the user configuration information 525 are protected by the system RAID group 1.

User RAID group 1 may then be created in a similar manner. User configuration information 525 can be used to create user RAID group 1. For example, the create user RAID group/LUN procedure 520 can be used to create user RAID group 1 with user LUN 1, user LUN 2, and corresponding user data stored thereon. Here again, the integrity of the user drives used to store user LUN 1, user LUN 2 and respective user data are protected by the user RAID group 1.

As a result, the system RAID group 1 and user RAID group 1 configuration protect the integrity of the data stored thereon. However, the system configuration information 510 remains unprotected. This is because the system configuration 510 information is stored on the raw disk storage area along with the RAID configuration mechanisms. It's a chicken-egg scenario—the storage area storing system configuration 510 information needs to be protected, but the RAID mechanisms necessary to protect it are stored in the same area. In other words, the integrity of the system drives are unprotected before the system RAID group 1 gets initialized because storage array software needs to obtain system configuration 510 information from raw disk regions. As a result, if the system configuration 510 information gets corrupted, the system RAID group 1 and system LUN 1 would be corrupted resulting in potentially catastrophic user data loss or unavailability. Techniques described herein have been developed to protect configuration data in a storage array that allows drives to be moved to different slots in the array. Accordingly, new data structures and algorithms have been described that, in conjunction with portable drives, provide a mechanism to reduce data loss and data unavailability during system booting path as well as storage system on-line states.

Figure 6:
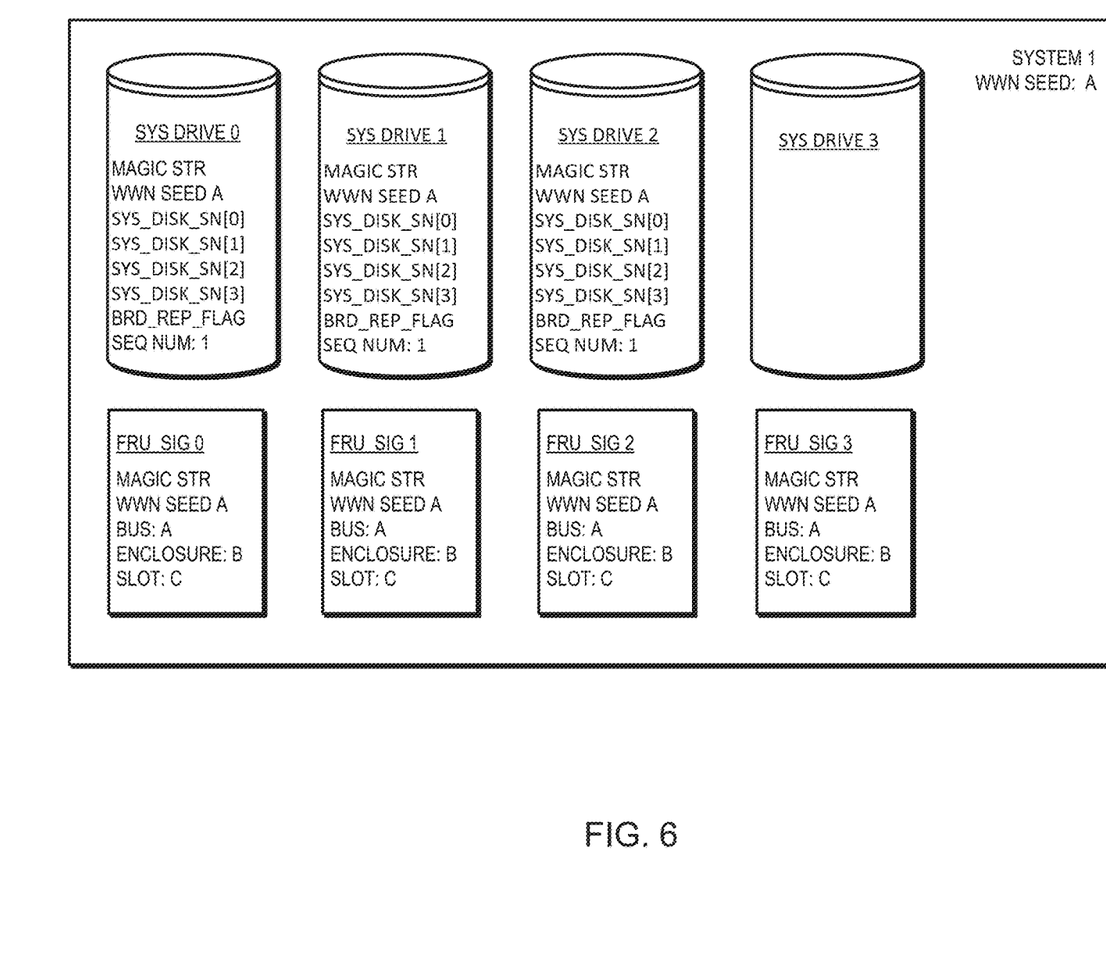
FIG. 6 is a diagram illustrating system drive data structures.

FIG. 6 is depicts data structures, referred to as HW_FRU_DESCRIPTOR, that may be stored on each of a storage array's system drives, where the drives are identified as residing in a specific array, system 1. The data structure provides the ability to allow the storage system to recognize a drive's type—whether it is a system drive or a user drive. An algorithm described herein takes advantage of the data structure to implement handling logic that accounts for different drive types. As a result, the techniques described provide the ability to inform a system and user what kind of drive is in a system drive slot (i.e., the first 4 slots), and provide more accurate error diagnostics and error information based on a particular drive type and the slot the drive resides in (i.e., user slot or system slot).

In an example embodiment, HW_FRU_DESCRIPTOR data structures for the first three system drives are shown in FIG. 6. Each HW_FRU_DESCRIPTOR data structure includes the following fields: magic str, WWN seed a, sys_disk_SN[0], sys_disk_SN[1], sys_disk_SN[2], sys_disk_SN[3], brd_rep_flag, and seq num. Magic str is a string variable that indicates whether or not the HW_FRU_DESCRIPTOR structure is initialized. WWN seed is a valued that may be used to identify which storage array the particular drive belongs to. This value gets initialized when, for example, an array is first initialized. Alternatively, this value may be overwritten during servicing procedures and the like.

Each HW_FRU_DESCRIPTOR also contains the serial number for each of the four system drives. In this embodiment, the respective HW_FRU_DESCRIPTORs are stamped into the first three system drives. These three copies are consistent with each other and stored in 3-way-mirror. The serial number of every system drive is stored in each system drive using the sys_disk_SN0-sys_disk_SN3 variables in an array index where the index value corresponds to a system slot location. For example, the serial number of the system drive located in system slot 0 is stored in sys_disk_SN[0], the serial number of the system drive located in system slot 1 is stored in sys_disk_SN[1], the serial number of the system drive located in system slot 2 is stored in sys_disk_SN[2], and the serial number of the system drive located in system slot 3 is stored in sys_disk_SN[3]. Thus, advantageously, the techniques described can cover, for example, a scenario where the system drives installed in the wrong order by comparing the HW_FRU_DESCRIPTOR with the system drives' actual physical slot location. In alternative embodiments, the HW_FRU_DESCRIPTORs may be stamped in all four system drives.

The serial number is a unique identifier for every drive that may be, for example, a serial number provided by the drive manufacturer. Thus, the serial number may be used as a global identifier whereby the serial number of every system drive in the system may be stored in the descriptor structure. This also provides ordering information in that the serial number would be recorded in the system disk and consequently, the system will know where each and every drive is located, thereby providing a drive ordering mechanism lacking in conventional storage systems.

Other variable include a board replacement flag called brd_rep_flag that is used to show user intention implicitly, that is, if a user intends to replace the storage array's system chassis, and in such a case, this flag may be set to indicate as much. A sequence number variable, Seq Num, is provided and is used to check whether that particular HW_FRU_DESCRIPTOR data structure is up to date (as compared with other HW_FRU_DESCRIPTORs).

The relationship of the system drives to a particular system (i.e., the system the drives belong to) may be accomplished using the WWN seed value. For example, the storage system may be uniquely identified using a unique identifier, such as a serial number stored in a chassis PROM, which can be stored in a system 1 WWN seed variable. The sys drive's WWN seed may be compared with the system's WWN seed value to determine is they match.

Thus, implementing current techniques described herein, the new descriptor structure is leveraged to record the system ordering and location information as well as the relationship between system drives in the array.

Alternative example embodiments may further make use of an FRU signature data structure called an FRU_SIG including the following variables: magic string, WWN seed, bus, enclosure, and slot. The FRU_SIG may also be stamped on every drive in array and is initialized when a drive gets installed and initialized the first time it's brought online. The variables are defined as follows. Magic string indicates whether the FRU_SIG structure itself is initialized or not. The WWN Seed indicates the drive's home or current storage array. Bus, enclosure and slot indicate the drive's location based on the values stored therein. Techniques described herein may leverage the drive signature to identify drive movement. If the drive is moved, of the system components will see the drive location has been changed and is not consistent with this signature location. The may be used to identify drive type as described below in conjunction with FIG. 7 and use cases described in FIG. 8.

Figure 7:
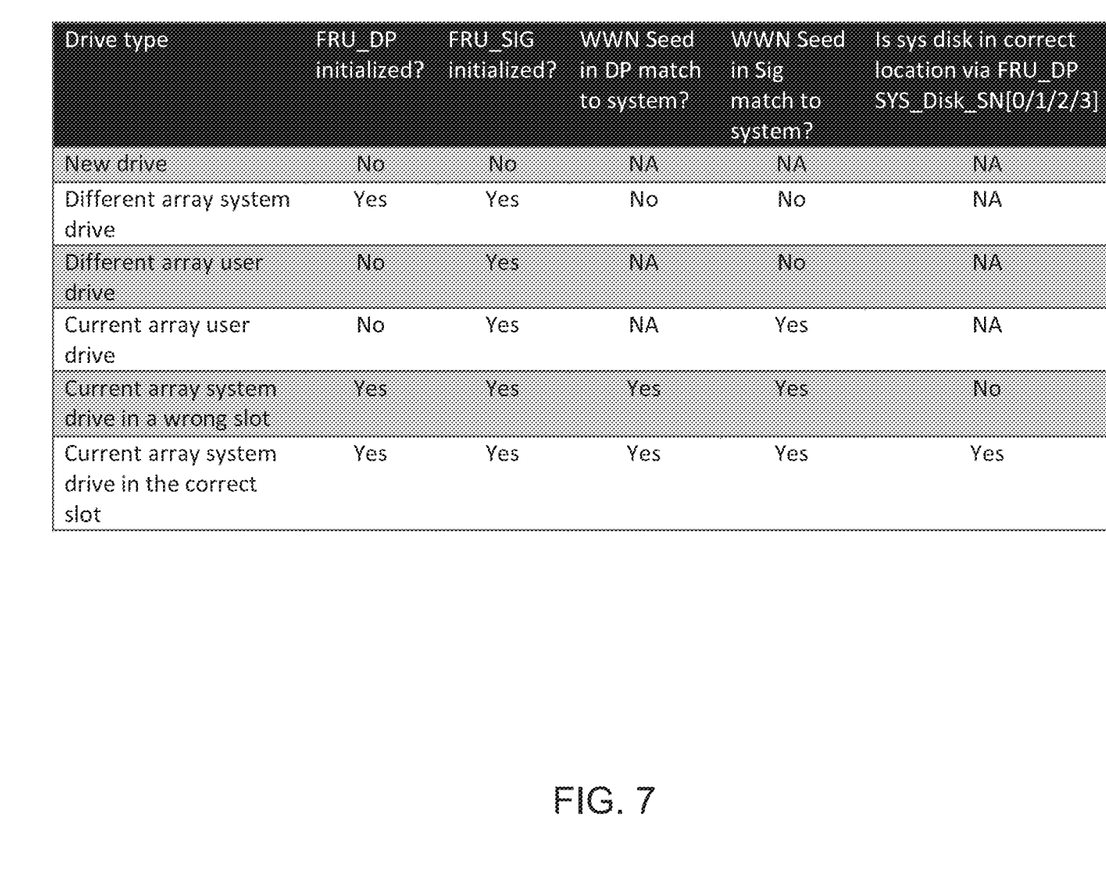
FIG. 7 is a table illustrating results obtained utilizing the techniques described herein.

Referring to FIG. 7, shown is a table illustrating various example use cases and corresponding results that may be obtained with example embodiment implementing techniques described herein for providing drive type recognition capability. The following examples may be consistent with a data storage system which also performs processing consistent with discussions above regarding functionality of FIGS. 4 and 5 and the data structures consistent with FIG. 6. The listed drive types may be recognized and identified based on the status and contents of HW_FRU_DESCRIPTOR (abbreviated as FRU_DP in the table) and FRU_SIG data structures consistent with those described above with reference to FIG. 6.

The rows of the table represent six different drive type definitions that may be identified implementing techniques described herein and include:

1. New Drive—a drive that has not been used in an array before.
2. Different array system drive—a system drive that comes from a different array.
3. Different array user drive—a user drive that comes from a different array.
4. Current array user drive—a user drive that belongs to the current array.
5. Current array system drive in a wrong slot—a system drive that belongs to the current array but is in the wrong slot.
6. Current array system drive in the correct slot—a system drive that belongs to the current array and is in its original (i.e., correct) slot.

The six drive types are determined based on the values of one or more variables corresponding to each column. Each of the six cases is represented by information in a single row of the table. The table is arranged as follows: a first column indicating a drive type; a second column indicating if the FRU_DP data structure (also referred to as HW_FRU_DESCRIPTOR) has been initialized; a third column indicating if an FRU_SIG data structure was initialized; a fourth column indicating if the HW_FRU_DESCRIPTOR's WWN seed matches the WWN of the system in which the drive currently resides; a fifth column indicating if the WWN seed in FRU_SIG matches the WWN of the system in which the drive currently resides; and a sixth column indicating is a system disk is in the correct location based on the HW_FRU_DESCRIPTOR sys_disk_sn[0/1/2/3] array values.

Based on these values, the drive type may be determined. For example, with reference to the first drive type use case corresponding to a new drive, if the FRU_DP is not initialized and the FRU_SIG is not initialized, it can be determined that the drive in question is a new drive. In the second use case, it can be determined that the drive is a system drive from a different array if FRU_DP is initialized, and FRU_SIG is initialized, and the WWN seed in FRU_DP does not match the system WWN seed, and the WWN seed in FRU_SIG does not match the system WWN seed. In the third use case, the drive type is a user drive from a different array if FRU_DP is not initialized and FRU_DP is initialized and the WWN seed in FRU_SIG does not match the system WWN seed. In the fourth use case, a drive is a user drive that belongs to the current array if FRU_DP is not initialized and FRU_SIG is initialized and the WWN seed in FRU_SIG matches the system WWN seed. In the fifth use case, a current array's system drive is in the wrong slot if FRU_DP is initialized and FRU_SIG is initialized and the WWN seed in FRU_DP matches the system WWN seed and the WWN seed in FRU_SIG matches the system WWN seed and the system disk is not in the correct location based on the contents of FRU_DP's sys_disk_sn[0/1/2/3]. In the sixth use case, a current array's drive is in the correct slot if the FRU_DP is initialized and FRU_SIG is initialized and the WWN seed in FRU_DP matches the system WWN seed and the WWN seed in FRU_SIG matches the system WWN seed and the system disk is in the correct location based on the contents of FRU_DP's sys_disk_sn[0/1/2/3].

Figure 8:
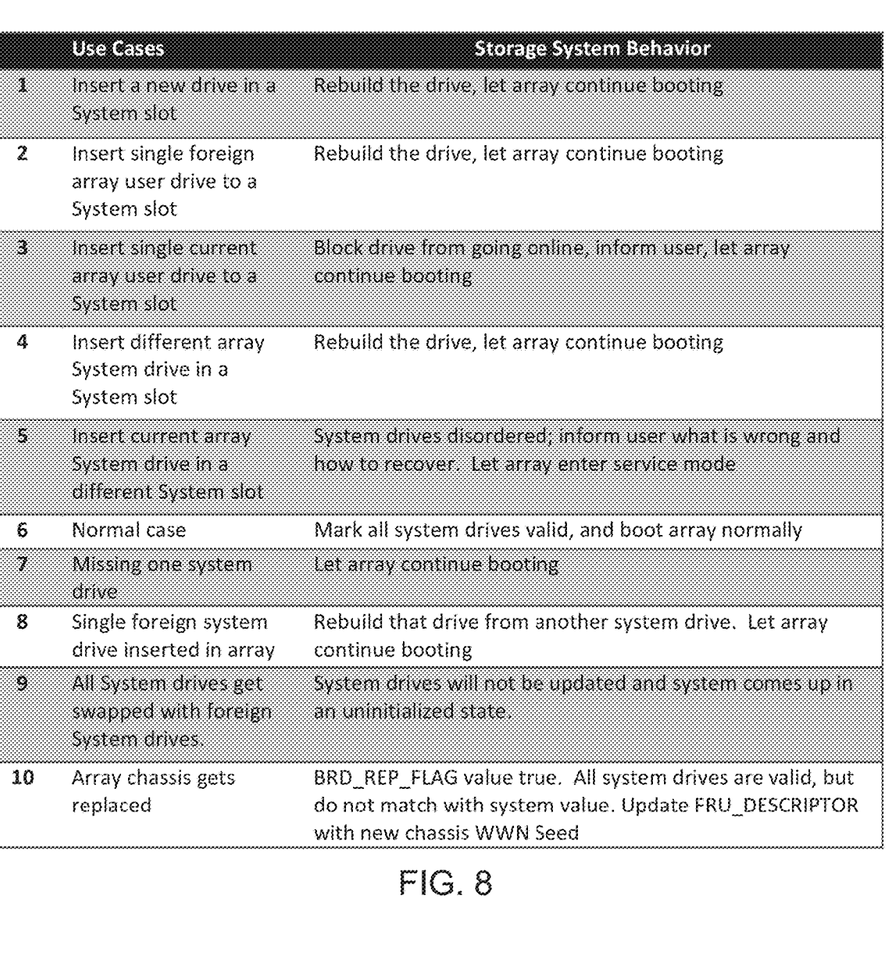
FIG. 8 is a table illustrating results obtained utilizing the techniques described herein.

FIG. 8 is a table illustrating various use cases and corresponding storage system behavior derived from example embodiments employing the drive type recognition techniques described herein. The following examples may be consistent with a data storage system which also performs processing consistent with discussions above regarding functionality of FIGS. 4 and 5 and the data structures shown in FIG. 6.

The rows of the table represent six different drive type definitions that may be identified implementing techniques described herein and include:

1. Insert a new drive in a DB slot
2. Insert single foreign array user drive to a DB slot
3. Insert single current array user drive to a System slot
4. Insert other array System drive in a System slot
5. Insert current array System drive to another System slot
6. Normal case
7. Missing one system drive
8. Single foreign system drive inserted in array
9. All System drives get swapped with foreign System drives.
10. Array chassis gets replaced The storage system's behavior may be controlled based on the particular use cased based on recognition of the drive type. For example, in use case 1, when a new drive is inserted in a system slot, the array may rebuild the drive and let the array continue booting. In use case 2, if a single foreign array user drive is inserted into a system slot, the array may rebuild the drive and let the array continue booting. In use case 3, if a single current array user drive is inserted in a system slot, the array may block the drive from going online, inform user, and let array continue booting. In use case 4, if system drive from a different array is inserted in a system slot, the array may rebuild the drive and let array continue booting.

In use case 5, if a current array system drive is inserted in a different system slot, the array drives are in a disordered, invalid state and the array will notify the user what is wrong and how to recover by, for example, telling the user specifically how to correct the situation by providing information on what particular drive belongs in which particular slot. The array may be directed to enter service mode. In use case 6, if the drives are recognized as residing in the correct locations, the array may mark all system drives as valid, and the array will boot normally. In use case 7, if it is determined that one system drive is missing, the array will be allowed to continue booting. In use case 8, if a single foreign/different system drive is inserted in the array, the array may rebuild that drive from another system drive and may let the array continue booting. In use case 9, if all the system drives get swapped with foreign system drives, the system drives will not be updated and array will come up in an uninitialized state. In use case 10, if it is determined that the array chassis has been replaced (i.e., the BRD_REP_FLAG value is true), all the system drives will be identified as valid, but will not match with system seed value. As such, the HW_FRU_DESCRIPTOR will be updated with a new chassis WWN Seed value.

In example embodiments, the following logic or algorithm may be implemented in conjunction with the aforementioned data structures to recognize and identify system and user drives and initiate particular actions based on such identification:

1. Read all the HW_FRU_DESCRIPTORs and FRU_SIG of four system disks.
2. Read WWN Seed from chassis PROM, for use as unique system identifier.
3. Compare each copy HW_FRU_DESCRIPTOR WWN seed to system WWN seed to choose candidates with a valid HW_FRU_DESCRIPTOR. Choose the copy with highest Seq Num in candidates' copies.
4. Get each drive's type (using techniques described in connection with FIG. 7, for example).
   a. If all system drives are "Current array system drive in the correct slot," mark all system drives as valid.
   b. If all system drives are "Different array system drive," check one flag
      i. If flag is FALSE and Board_replacement_flag is TRUE, this may be identified as a chassis replacement. Update the PROM with the WWN seed from system drives.
      ii. If Flag is TRUE and Board_replacement_flag is FALSE, this may be identified as a WWN seed change. Update the drives FRU_SIG with the PROM's WWN seed value.
      iii. If both flags are TRUE or both are FALSE, the array may be identified as being in an invalid state, and the array may be instructed to enter degraded mode.
   c. If not all system drives are "Current array system drive in the correct slot," mark any such drives as invalid.
5. Analyze any identified invalid drives based on the drive type that was identified according to the following policies:
   a. If there are no more than two invalid drives.
      i. For "New drive," "No drive," "Different array user drive" and "Different array system drive" consume the drive.
      ii. For "Current array system drive in a wrong slot," it indicated the array is in system drive disorder case, and as such, instruct array to enter degraded mode. Also inform the user how to recover from this situation (may require manual user intervention to restore the array to a proper operating condition).
      iii. For "Current array user drive," prevent the array from going online in order to protect the user data on this drive.
   b. If there are more than two invalid drives, the array is instructed to enter degraded mode.
6. HW_FRU_DESCRIPTOR Seq Num is increased by 1, when HW_FRU_DESCRIPTOR get updated. HW_FRU_DESCRIPTOR would be updated only when an acceptable drive gets inserted into a system slot. It should be noted that "New drive," "Other array user drive type" and "Other array system drive" may be considered acceptable drive types. The policy where determining whether a drive can or cannot be consumed may be implemented in this step. Data structure correctness is also maintained.

Advantageously, in contrast with conventional methods, the current techniques described herein provide for improved the system drive operation and integrity protection mechanism in a number of ways. First, system disks are under RAID protection while system is running. Any system disk movements can be detected even when they are in the service. Users can be presented with timely information to prevent further damage. As such, this can improve system uptime and inconvenience resulting from rebooting based on conventional methods. Second, these techniques can detect the disorder of system drives and provide the correct disk order information to the user. The order keeping mechanism can prevent damage to many other order sensitive modules. The correct information is much easier and faster to obtain for use in recovering the system. By contrast, conventional methods do not provide any diagnostic information thereby requiring a shotgun debugging approach). Third, the entire vault disks are taken into consideration with these techniques. Corner protection cases are better covered to improve system robustness. For example, when the forth system drive gets moved, the integrity of the forth drive is protected, in contrast conventional methods cannot protect the forth drive.

Other advantages include enhanced system design elasticity based on drive type recognition capabilities which can provide more accurate status information about system disks. By utilizing the information, different management logic can be implemented for different cases. Complex requirement changes are also easier to handle and implement. New drive types can also be introduced easily and can be integrated into the mechanisms provided by the current techniques. In addition, system disk hot plug in and pull out is also provided. Consequently, the aforementioned scenarios can be detected immediately online and, as a result, the protection operations are easier to implement.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The block diagrams in the FIGs illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams illustration, and combinations of blocks in the block diagrams illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for identifying a storage drive type in a data storage system, the method comprising:
   arranging, in a data storage system, a first set of storage devices dedicated as system management drives configured to store data storage system configuration information and a second set of storage devices dedicated as user drives configured to store user data, wherein the system management drives are arranged in a redundant array of independent drives (RAID) configuration according to data storage system RAID configuration logic, wherein the system management drives are data storage system slot location independent;
   creating a plurality of storage drive data structures configured to store data associated with the first set of system management drives, wherein each storage drive data structure includes a data structure initialization string, a unique storage system identifier, a plurality of unique system management drive identifiers associated with each respective system management drive, and a board replacement flag;
   storing respective data structures on each of the plurality of corresponding system management drive;
   initiating a data storage system reboot procedure;

verifying the consistency of the set of contents of the plurality of storage drive data structures, wherein verifying is performed before initiating RAID configuration logic;

reading, via an instruction initiated by a data storage system, a set of contents of one or more of the data structures stored on one or more of the plurality of system management drive; and determining a drive type for one or more system drives based on the set of contents.

2. The method of claim 1, further including identifying a data storage system slot location for the drive corresponding to the determined drive type.

3. The method of claim 1, further including determining, at the data storage system, a next action to be performed based on the determined drive type.

4. The method of claim 1, wherein the unique system management drive identifiers are associated with a serial number corresponding to the respective drive.

5. The method of claim 1, wherein identifying the drive type includes determining if the drive is a system management drive or a user drive.

6. The method of claim 1, wherein identifying the drive type includes determining if the drive is associated with a current data storage system or associated with a different data storage system.

7. The method of claim 1, wherein the data storage system supports portable drives.

8. The method of claim 1, further including determining that the plurality of system management drive are not in their correct system management drive slot location.

9. The method of claim 1, further including determining that a user drive is located in a system management drive slot.

10. The method of claim 1, further including determining that a user drive from a different data storage system is located in a system management drive slot.

11. A non-transitory computer readable medium comprising executable code stored thereon for building a code entity, the non-transitory computer readable medium comprising executable code for:

arranging, in a data storage system, a first set of storage devices dedicated as system management drives configured to store data storage system configuration information and a second set of storage devices dedicated as user drives configured to store user data, wherein the system management drives are arranged in a redundant array of independent drives (RAID) configuration according to data storage system RAID configuration logic, wherein the system management drives are data storage system slot location independent;

creating a plurality of storage drive data structures configured to store data associated with the first set of system management drives, wherein each storage drive data structure includes a data structure initialization string, a unique storage system identifier, a plurality of unique system management drive identifiers associated with each respective system management drive, and a board replacement flag;

storing respective data structures on each of the plurality of corresponding system management drive;

initiating a data storage system reboot procedure;

verifying the consistency of the set of contents of the plurality of storage drive data structures, wherein verifying is performed before initiating RAID configuration logic;

reading, via an instruction initiated by a data storage system, a set of contents of one or more of the data structures stored on one or more of the plurality of system management drive; and determining a drive type for one or more system drives based on the set of contents.

12. A system for identifying a storage drive type in a data storage system, the system comprising a storage processor and memory configured to:

arrange, in a data storage system, a first set of storage devices dedicated as system management drives configured to store data storage system configuration information and a second set of storage devices dedicated as user drives configured to store user data, wherein the system management drives are arranged in a redundant array of independent drives (RAID) configuration according to data storage system RAID configuration logic, wherein the system management drives are data storage system slot location independent;

create a plurality of storage drive data structures configured to store data associated with the first set of system management drives, wherein each storage drive data structure includes a data structure initialization string, a unique storage system identifier, a plurality of unique system management drives identifiers associated with each respective system management drives, and a board replacement flag;

store respective data structures on each of the plurality of corresponding system management drives;

initiate a data storage system reboot procedure;

verify the consistency of the set of contents of the plurality of storage drive data structures, wherein verifying is performed before initiating RAID configuration logic;

read, via an instruction initiated by a data storage system, a set of contents of one or more of the data structures stored on one or more of the plurality of system management drives; and determine a drive type for one or more system drives based on the set of contents.

13. The system of claim 12, further including identify a data storage system slot location for the drive corresponding to the determined drive type.

14. The system of claim 12, further including determine, at the data storage system, a next action to be performed based on the determined drive type.

15. The system of claim 12, wherein the unique system management drive identifiers are associated with a serial number corresponding to the respective drive.

16. The system of claim 12, wherein identify the drive type includes determining if the drive is a system management drive or a user drive.

17. The system of claim 12, wherein identify the drive type includes determining if the drive is associated with a current data storage system or associated with a different data storage system.

18. The system of claim 12, wherein the data storage system supports portable drives.

19. The system of claim 12, further including determine that the plurality of system management drives are not in their correct system management drive slot location.

20. The system of claim 12, further including determine that a user drive is located in a system management drive slot.

* * * * *